US011636022B2

(12) United States Patent
Lee et al.

(10) Patent No.: US 11,636,022 B2
(45) Date of Patent: Apr. 25, 2023

(54) SERVER AND CONTROL METHOD THEREOF

(71) Applicant: Samsung Electronics Co., Ltd., Suwon-si (KR)

(72) Inventors: Namki Lee, Suwon-si (KR); Seunghwan Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 461 days.

(21) Appl. No.: 16/821,439

(22) Filed: Mar. 17, 2020

(65) Prior Publication Data

US 2020/0334126 A1 Oct. 22, 2020

(30) Foreign Application Priority Data

Apr. 16, 2019 (KR) ........................ 10-2019-0044380

(51) Int. Cl.
*G06F 11/36* (2006.01)
*G06K 9/62* (2022.01)
*G06N 5/02* (2006.01)
*G06N 5/025* (2023.01)

(52) U.S. Cl.
CPC ........ *G06F 11/3608* (2013.01); *G06K 9/6256* (2013.01); *G06N 5/025* (2013.01)

(58) Field of Classification Search
CPC ... G06F 11/3608; G06K 9/6256; G06N 5/025
See application file for complete search history.

(56) References Cited

U.S. PATENT DOCUMENTS

| 5,063,522 A | * | 11/1991 | Winters | .................. G06N 5/04 |
| | | | | 706/50 |
| 9,268,544 B2 | | 2/2016 | Kang et al. | |
| 9,898,393 B2 | | 2/2018 | Moorthi et al. | |
| 10,540,257 B2 | | 1/2020 | Tezuka et al. | |
| 2009/0031211 A1 | | 1/2009 | Yao et al. | |

(Continued)

FOREIGN PATENT DOCUMENTS

| CN | 108304436 A | * | 7/2018 | ......... G06F 16/3329 |
| JP | 2010-097426 A | | 4/2010 | |

(Continued)

OTHER PUBLICATIONS

Hou et al, "Using SCL to Specify and Check Design Intent in Source Code", 2006, pp. 404-423, [Retrieved fron internet on Dec. 2, 2022], <https://ieeexplore.ieee.org/stamp/stamp.jsp?tp=&arnumber=1650215> (Year: 2006).*

(Continued)

*Primary Examiner* — S. Sough
*Assistant Examiner* — Zengpu Wei
(74) *Attorney, Agent, or Firm* — Jefferson IP Law, LLP

(57) ABSTRACT

A control method of a server is provided. The method includes acquiring code information about a program, identifying at least one error with respect to a code style included in the code information based on a predetermined code style rule, acquiring at least one error information with respect to the identified code style, and modifying the code style by inputting the code information and the error information to an artificial intelligence model in which the code style rule is trained.

10 Claims, 12 Drawing Sheets

(56) References Cited

U.S. PATENT DOCUMENTS

| | | | |
|---|---|---|---|
| 2009/0288066 | A1 | 11/2009 | Jeong et al. |
| 2012/0240100 | A1 | 9/2012 | Kang et al. |
| 2017/0147919 | A1 | 5/2017 | Lee et al. |
| 2017/0212829 | A1 | 7/2017 | Bales et al. |
| 2017/0357809 | A1 | 12/2017 | Smith |
| 2018/0011778 | A1* | 1/2018 | Shavro ................ G06F 11/3676 |
| 2018/0018165 | A1 | 1/2018 | Kim et al. |
| 2018/0074939 | A1 | 3/2018 | Bae et al. |
| 2018/0157524 | A1* | 6/2018 | Saxena ................ H04L 63/107 |
| 2018/0232296 | A1 | 8/2018 | Klein |
| 2018/0275989 | A1 | 9/2018 | Kakkad et al. |
| 2018/0276103 | A1 | 9/2018 | Woulfe et al. |
| 2020/0241861 | A1* | 7/2020 | Zhang ....................... G06F 8/70 |
| 2020/0301672 | A1* | 9/2020 | Li ............................. G06F 8/73 |

FOREIGN PATENT DOCUMENTS

| | | | |
|---|---|---|---|
| KR | 10-2010-0062821 | A | 6/2010 |
| KR | 10-2012-0053873 | A | 5/2012 |
| KR | 10-1585044 | B1 | 1/2016 |
| KR | 10-2017-0060567 | A | 6/2017 |
| KR | 10-2020-0071413 | A | 6/2020 |

OTHER PUBLICATIONS

International Search Report dated Jul. 17, 2020, issued in International Application No. PCT/KR2020/004787.
Programming style, Mar. 17, 2003 https://en.wikipedia.org/wiki/Programming_style.
Deep learning, Jul. 20, 2011 https://en.wikipedia.org/wiki/Deep_learning.

* cited by examiner

FIG. 5

| Source Code ( Javascript ) 10 | ESLint ( Javascript Code Style Checker ) 510 | | |
|---|---|---|---|
| 1 "use strict";<br>2<br>3 function test (value){<br>4     return "Hello World "+value;<br>5 } | BEFORE MODIFICATION | RULE | {<br>...<br>"rules": {<br>  "space-before-function-paren": 2,<br>  "function-paren-newline": 2,<br>  "indent": 2,<br>  "indent-legacy": 2<br>},<br>...<br>} |
| | | ERROR | NO ERROR |
| 1 "use strict";<br>2<br>3 function test (value) {<br>4     return "Hello World "+value;<br>5 } | MODIFICATION | RULE | {<br>...<br>"rules": {<br>  "space-before-function-paren": 2,<br>  "function-paren-newline": 2,<br>  "indent": 2,<br>  "indent-legacy": 2,<br>  "space-before-blocks": 2 — 521<br>},<br>...<br>} |
| | | ERROR | 3:22 - Missing space before opening brace. 530  520 |

| Source Code ( Javascript ) | | COMMON RULE (WHITESPACE SHOULD BE INPUT WHEN USING '+' ) |
|---|---|---|
| 1 "use strict";<br>2<br>3 function test (value){<br>4   return "Hello World "+value;<br>5 } | ESLint<br>error<br>message<br>text | 4:25 - Operator '+' must be spaced. ~611 |
| 1 "use strict";<br>2<br>3 function test (value){<br>4   return "Hello World " + value;<br>5 } | JSLint<br>error<br>message<br>text | Expected one space between 'Hello World' and '+'.<br>Expected one space between '+' and 'value'. ~621 |

FIG. 7B

711 — CODE INFORMATION

```
@@ -1,5 +1,5 @@
-export function funcPromiseRacewithTimeout(func: Promise<any>, time: number, timeoutMessage: string) : Promise<any> {
+export function funcPromiseRacewithTimeout(func: Promise<any>, time: number, timeoutMessage: string) : Promise<any> {
    return Promise, race([
        new Promise((resolve, reject) =>{
diff --git a/tslint.json b/tslint.json
```
— 735

721 — CODE STYLE RULE

```
"typedef-whitespace": [
true,
{
    "call-signature": "nospace",
    "index-signature": "nospace",
    "parameter": "nospace",
    "property-declaration": "nospace",
```
— 740

722 — ERROR INFORMATION

```
/Lib/ace-promise-timeout/ ts[2, 1-1]:  expected nospace before colon in call-signature  — 750
/us/toolbar/connect-target. tsx[57, 25]:  expected nospace before colon in variable-declaration
```
— 760

723 — CODE STYLE PROCESSOR

```
export function funcPromiseRacewithTimeout(func: Promise<any>, time: number, timeoutMessage: string) : Promise<any> {
    return Promise, race([
        new Promise((resolve, reject) =>{
            let timer = setTimeout(() =>{
                clearTimeout(timer)
                reject(new Error(timeoutMessage))
            }, time)
```
I suggest the following modification by AI Style. Do you want to edit it? — 770
```
export function funcPromiseRacewithTimeout(func: Promise<any>, time: number, timeoutMessage: string) : Promise<any> {
    return Promise, race([
        new Promise((resolve, reject) =>{
            let timer = setTimeout(() =>{
                clearTimeout(timer)
                reject(new Error(timeoutMessage))
            }, time)
```

SERVER AND CONTROL METHOD THEREOF

CROSS-REFERENCE TO RELATED APPLICATION(S)

This application is based on and claims priority under 35 U.S.C. § 119(a) of a Korean patent application number 10-2019-0044380, filed on Apr. 16, 2019, in the Korean Intellectual Property Office, the disclosure of which is incorporated by reference herein in its entirety.

BACKGROUND

1. Field

The disclosure relates to a server and a control method thereof. More particularly, the disclosure relates to a server for modifying a code style of code for a program and a control method thereof.

2. Description of the Related Art

Code for a program is managed in a module unit or an organizational unit according to source sizes or functions constituting the code, and the corresponding program is being developed by a single developer or a plurality of developers.

When a program is developed by a plurality of developers, a code style of the code worked by the plurality of developers may be different according to characteristics of each developer.

To address the above, a plurality of developers work on a program based on guided code style rules. Accordingly, the code style of the code worked by the plurality of developers can be unified.

Nevertheless, when coding languages used for development work for the program are different, or when error check tools for error checking of code styles are different, code styles worked by the developers may have a problem.

Accordingly, the plurality of developers perform unnecessary work to modify the code style of the worked code, thereby decreasing productivity for program development.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device that automatically identifies layout and identification information of a plurality of display devices forming a video wall, thereby reducing a human error and increasing user convenience, and a control method thereof.

Additional aspects will be set forth in part in the description which follows and, in part, will be apparent from the description, or may be learned by practice of the presented embodiments.

In accordance with an aspect of the disclosure, a control method of a server is provided. The method includes acquiring code information about a program, identifying at least one error with respect to a code style included in the code information based on a predetermined code style rule, acquiring at least one error information with respect to the identified code style, and modifying the code style by inputting the code information and the at least one error information to an artificial intelligence (AI) model in which the code style rule is trained.

In accordance with another aspect of the disclosure, a server is provided. The server includes a communicator including a circuit, a memory including at least one instruction, and at least one processor configured to execute the at least one instruction, wherein the at least one processor is configured, based on code information about a program received from the at least one user terminal device being acquired through the communicator, to identify at least one error with respect to a code style included in the code information based on a predetermined codes style rule, acquire at least one error information with respect to the identified code style, and modify the code style by inputting the code information and the at least one error information to an artificial intelligence model in which the code style rule is trained.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5 is a diagram of modifying a code style based on error information generated according to a code style rule in a server according to an embodiment of the disclosure;

FIG. 6 is a diagram of acquiring changed error information in a server according to a code style check tool according to an embodiment of the disclosure;

FIG. 7B is a diagram illustrating learning of an artificial intelligence model for a code style modification of a program according to an embodiment of the disclosure;

DETAILED DESCRIPTION

Figure 1A:
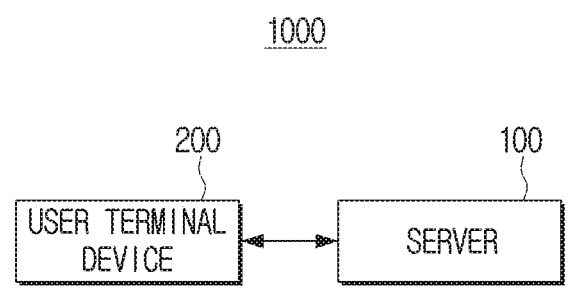
FIG. 1A is a system diagram of performing error checking on a program according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure, the terms "include", "may include", "comprise", and "may comprise" designate the presence of features (e.g., elements, such as numbers, functions, operations, or components) that are written in the specification, but do not exclude the presence or possibility of addition of one or more other features.

In the description, the term "A or B", "at least one of A or/and B", or "one or more of A or/and B" may include all possible combinations of the items that are enumerated together. For example, the term "A or B" or "at least one of A or/and B" may designate (1) at least one A, (2) at least one B, or (3) both at least one A and at least one B.

In the description, the terms "first, second, and so forth" are used to describe diverse elements regardless of their order and/or importance and to discriminate one element from other elements, but are not limited to the corresponding elements.

When an element (e.g., a first element) is "operatively or communicatively coupled with/to" or "connected to" another element (e.g., a second element), an element may be directly coupled with another element or may be coupled through the other element (e.g., a third element). On the other hand, when an element (e.g., a first element) is "directly coupled with/to" or "directly connected to" another element (e.g., a second element), an element may not be existed between the other element.

In the description, the term "configured to" may be changed to, for example, "suitable for", "having the capacity to", "designed to", "adapted to", "made to", or "capable of" under certain circumstances. The term "configured to (set to)" does not necessarily mean "specifically designed to" in a hardware level. Under certain circumstances, the term "device configured to" may refer to "device capable of" doing something together with another device or components. For example, "a sub-processor configured (or configured to) perform A, B, and C" may refer to a generic-purpose processor (e.g., central processing unit (CPU) or an application processor) capable of performing corresponding operations by executing a dedicated processor (e.g., an embedded processor) or one or more software programs stored in a memory device to perform the operations.

An electronic apparatus according to various embodiments may include at least one of, for example, smartphone, tablet personal computer (PC), mobile phone, video phone, e-book reader, desktop PC, laptop PC, netbook computer, workstation, server, personal digital assistant (PDA), portable multimedia player (PMP), a moving picture experts group (MPEG-1 or MPEG-2) audio layer 3 (MP3) player, medical device, camera, or a wearable device.

In an embodiment of the disclosure, the term "a user" may indicate a person using an electronic apparatus or an apparatus which uses an electronic apparatus (for example, artificial intelligent electronic apparatus).

FIG. 1A is a system diagram of performing error checking on a program according to an embodiment of the disclosure.

Figure 1B:
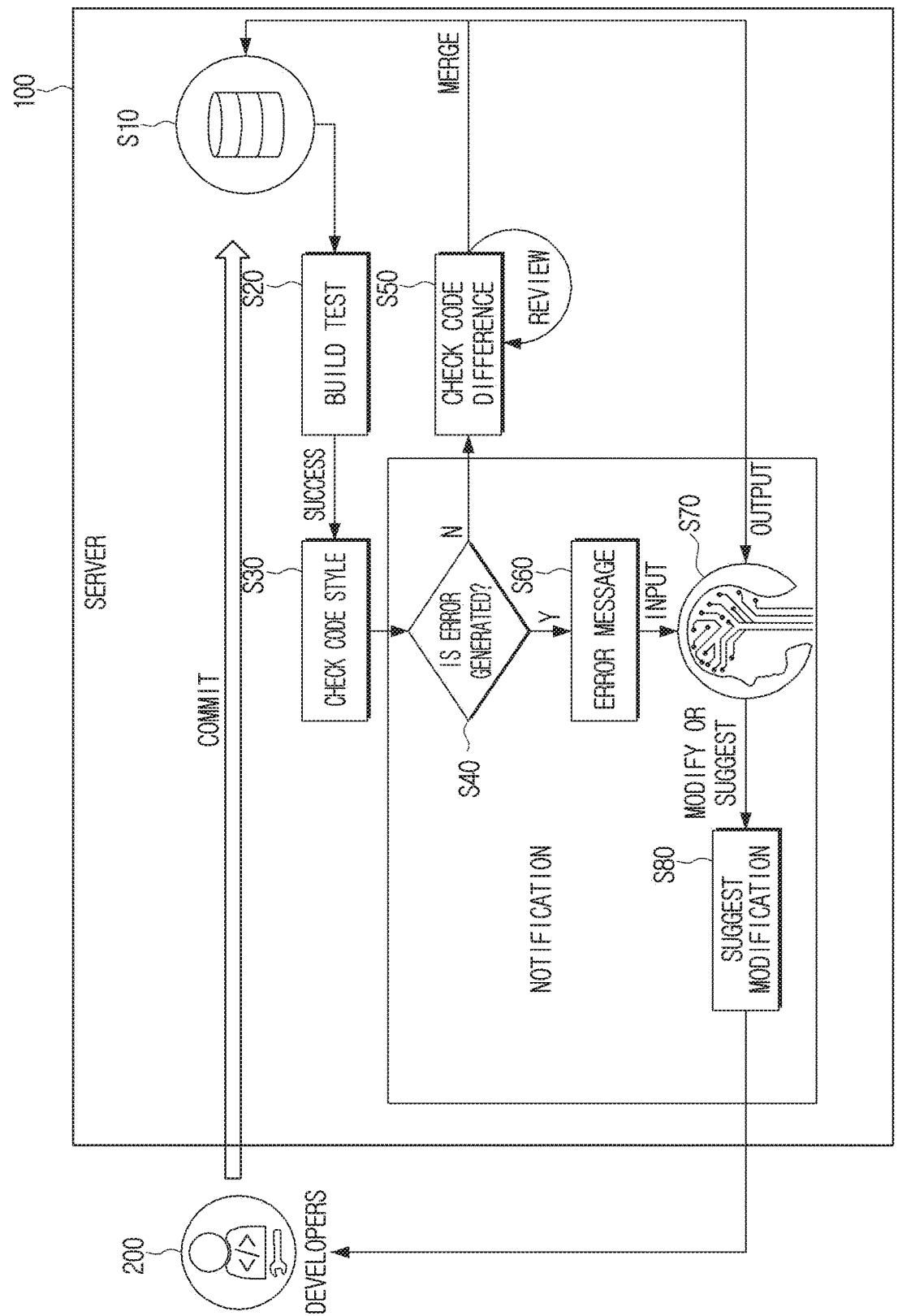
FIG. 1B is a diagram of a system of performing error checking on a program according to an embodiment of the disclosure.

FIG. 1B is a diagram of a system of performing error checking on a program according to an embodiment of the disclosure.

Referring to FIG. 1A, a system 1000 which performs error checking on a program includes a server 100 and at least one user terminal device 200. The server 100 may store code information received from the user terminal device 200. The code information may refer to source code for a program developed by a developer. In addition, the server 100 may transmit code information for a program requested by a user among a plurality of pre-stored programs to the user terminal device 200 of the corresponding user.

The user terminal device 200 is an electronic device, such as a PC, a smartphone, and a tablet PC, and the user terminal device 200 may transmit the code information for a program developed by the user to the server 100 according to a user command. Accordingly, the server 100 may store code information for the program received from the user terminal device 200.

In addition, the user terminal device 200 may request a program code corresponding to a user request from among a plurality of pre-stored program codes in the server 100, and receive code information for the corresponding program from the server 100.

Accordingly, the user may use the program requested by the user based on the code information received from the server 100 through the user terminal device 200.

Meanwhile, the server 100 may store the code information for the program received through an embodiment of FIG. 1B when the code information for the program is received from at least one user terminal device 200.

Referring to FIG. 1B, the server 100 stores code information for a program transmitted from at least one user terminal device 200 in a memory 120 at operation S10. Thereafter, the server 100 acquires code information for the program stored in the memory 120 and identifies (or, determines) whether the corresponding program operates normally by performing a Build Test operation on the acquired code information at operation S20.

At operations S30 and S40, as a result of the identification (or, determination), when the program operates normally, the server 100 checks a predetermined code style rule, and then identifies (or determines) whether there is an error in the code style included in the code information on the corresponding program based on the checked code style rule.

The code style rule is to define a code style, such as a text type, a text size, a space between text and a symbol, a line space, and the like that constitute code information.

Therefore, the server 100 identifies whether there is an error in the code style included in the code information for the program received from the at least one user terminal device 200 based on the predetermined code style rule.

If it is identified that there is no error, the server 100 reviews and stores the code information at operation S50. Meanwhile, if it is identified that there is an error, the server 100 acquires error information on the identified code style at operation S60. Thereafter, at operations S70 and S80, the server 100 inputs the acquired error information and the code information for the received program into an artificial intelligence model to modify a code style which has an error or to suggest modification about the code style which has an error. Then, the server 100 stores code information including the modified code style.

A system that performs error checking on a program has been described.

Hereinafter, each configuration of the server 100 described above will be described below.

Figure 2:
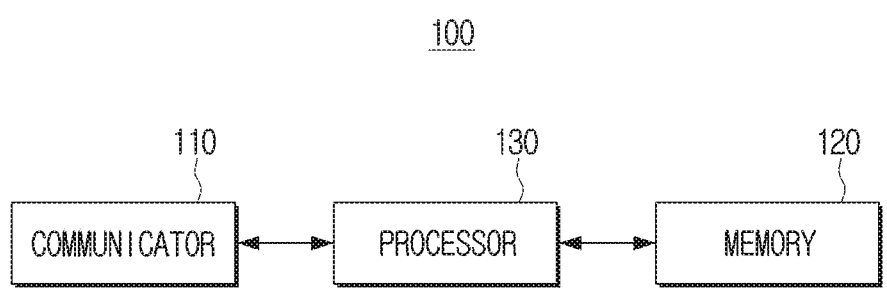
FIG. 2 is a block diagram of a server according to an embodiment of the disclosure.

FIG. 2 is a block diagram of a server according to an embodiment of the disclosure.

Referring to FIG. 2, the server 100 includes a communicator 110, a memory 120, and a processor 130.

The communicator 110 including a circuit may perform data communication with the user terminal device 200 to receive code information for a program transmitted from the user terminal device 200, or transmit code information for the program requested by the user terminal device 200 among the plurality of pre-stored programs to the user terminal device 200.

Such communicator 110 may perform data communication with an electronic device including the user terminal device 200 and an artificial intelligence server (not illustrated) through various communication protocols, such as Hyper Text Transfer Protocol (HTTP), Extensible Messaging and Presence Protocol (XMPP), Secure Sockets Layer (SSL), File Transfer Protocol (FTP), Content Centric Networking (CCN), and the like.

However, the disclosure is not limited thereto, and the communicator 110 may perform data communication with the electronic device including the user terminal device 200 and the artificial intelligence server (not illustrated) according to various wireless communication standards, such as Wi-Fi, 3rd Generation (3G), 3rd Generation Partnership Project (3GPP), Ling Term Evolution (LTE), and the like.

The memory 120 includes at least one instruction for driving the server 100. For example, the memory 120 may store code information for a program received from at least one user terminal device 200, or may store various modules for error detection of a code style included in the code information for the received program.

The module for error detection of the code style included in such code information will be described below.

The processor 130 executes at least one instruction stored in the memory 120.

For example, when code information for the program received from at least one user terminal device 200 through the communicator 110 is acquired, the processor 130 may identify (or, determine) at least one error regarding the code style included in the code information based on a predetermined code style rule.

Thereafter, the processor 130 acquires at least one error information for the identified (or, determined) code style, inputs corresponding code information and error information into the artificial intelligence model to modify the code style in which the at least one error is detected.

Specifically, the processor 130 determines an error of the code style included in the code information for the program using at least one code style check tool.

The code style check tool may refer to ESLint, JSLint, or the like when code information for the program is implemented in a JavaScript format according to an embodiment of the disclosure.

The code style check tool is a tool for detecting an error of a code style included in code information for a program based on the predetermined code style rule.

Since the code style check tool is a known technique, detailed description thereof will be omitted in the disclosure.

Meanwhile, the processor 130, according to the code style check tool, that detects an error of the code style included in the code information for the program may differently acquire error information for an error detected from the code style included in the code information for the program by using at least one code style check tool.

According to an embodiment of the disclosure, when an error of the code style included in code information for a program is detected, the processor 130 may acquire a first type of error information related to a first tool by using a first tool of at least one code style check tool.

When an error of the code style included in code information for a program is detected, the processor 130 may acquire a second type of error information related to a second tool by using a second tool of at least one code style check tool.

When the error information on the error of the code style included in the code information is acquired by using the code style check tool, the processor 130 inputs the acquired error information and the corresponding code information into the AI model, and modifies the error of the codes style included in the code information.

The AI model may be a trained model based on a predetermined code style rule and the first type of error information. Therefore, when the first type of error information on the code style included in the code information is acquired through the first tool, the processor 130 inputs the first type of the acquired error information and code information into the AI model.

However, the disclosure is not limited thereto, and when the first type of the error information on the error of the code style included in the code information is acquired through the first tool, the processor 130 may input the first type of the acquired error information and the predetermined code style rule into the Ai model.

When the first type of the error information and the code information is input, the AI model trained based on the predetermined code style rule and the first type of the error information, the processor may modify a code style included in the code information based on the input first type of the error information.

Meanwhile, as described above, the AI model may further learn not only the predetermined code style rule and the first type of the error information, but also input code information and code information in which the code style is modified.

Meanwhile, the processor 130 may change the code style check tool for error detection from the first tool to the second tool according to the user command, and may use the changed second tool to acquire error information on the error of the code style included in the code information.

As described above, when the error of the code style included in the code information is detected, the second tool generates the second type of error information related to the second tool.

Therefore, when the second type error information on the error of the code style included in the code information is acquired through the second tool, the processor 130 inputs the acquired error information of the second type and the code information into the AI model.

As described above, the AI model trained based on the predetermined code style rule and the first type of the error information, when the second type of error information is continuously input, may be learned based on the input the second type of error information and the predetermined code style rule.

Therefore, when the second type of error information and code information are input, the AI model trained based on the second type of error information and the predetermined code style rule may modify the code style included in the code information based on the input second type or error information.

When the changed code style rule is input in relation to the predetermined code style rule, the processor 130 identifies (or, determines) at least one error of the code style included in the code information based on the changed code style rule, and acquire at least one error information on the identified (or, determined) code style.

Meanwhile, when the changed code style rule is input, the processor 130 inputs the changed code style rule into the AI model. Accordingly, the AI model learns the changed code style rule when the changed code style rule is input.

While the AI model learns the changed code style rule, when error information for the error of the code style included in the code information is acquired by using the code style predetermined based on the changed code style rule, the processor 130 inputs the acquired error information and the code information into the AI model.

Therefore, when the code information and the error information are input through the processor 130, the AI model may modify the code style included in the code information based on the changed code style rule and the input error information.

When the code style included in the code information is modified, the processor 130 stores the code information including the modified code style in the memory 120.

The processor 130 performs a build test based on the acquired code information before modifying the error of the code style included in the code information for the program through the AI model, and identifies whether the corresponding program operates normally. As a result of the identification, if the program does not operate normally, the processor 130 transmits build test error information for the program to the user terminal device 200 that has transmitted the code information through the communicator 110.

Meanwhile, if the program operates normally, the processor 130 may, as described above, modify the error of the code style included in the code information for the program through the AI model.

The respective configuration of the server 100 according to an embodiment has been described above.

Hereinafter, various modules stored in the memory 120 according to the disclosure will be described below.

Figure 3:
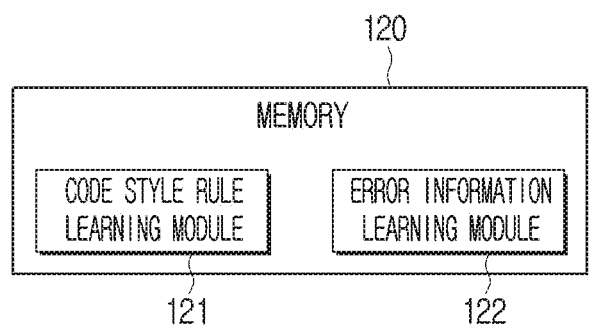
FIG. 3 is a block diagram of a memory for storing various modules for error modification of a code style included in code information for a program according to an embodiment of the disclosure.

FIG. 3 is a block diagram of a memory for storing various modules for error modification of a code style included in code information for a program according to an embodiment of the disclosure.

Referring to FIG. 3, the memory 120 may include a code style rule learning module 121 and an error information learning module 122.

The code style rule learning module 121 is a module for learning the corresponding code style rule so that a code style included in code information for a program can be defined based on a code style rule predetermined in an AI model.

The error information learning module 122 is a module for modifying the code style included in the code information based on the error information acquired by using the code information and the predetermined code style check tool in the AI model.

Specifically, the processor 130 detects an error of the code style included in code information by using the predetermined code style check tool, and acquires error information on the detected error.

More specifically, the code style check tool detects the error of the code style included in code information based on the predetermined code style rule, and generates error information on the detected error. Therefore, when the error information generated through the code style check tool is acquired, the processor 130 inputs the acquired error information and code information into the AI model. When the error information and the code information are input to the AI model, the error information learning module 122 may modify the error of the code style included in the code information based on the code style rule learned through the code style rule learning module 121 and the error information.

Hereinafter, a control method of the server 100 for modifying the code style included in code information for a program according to the disclosure will be described below.

Figure 4:
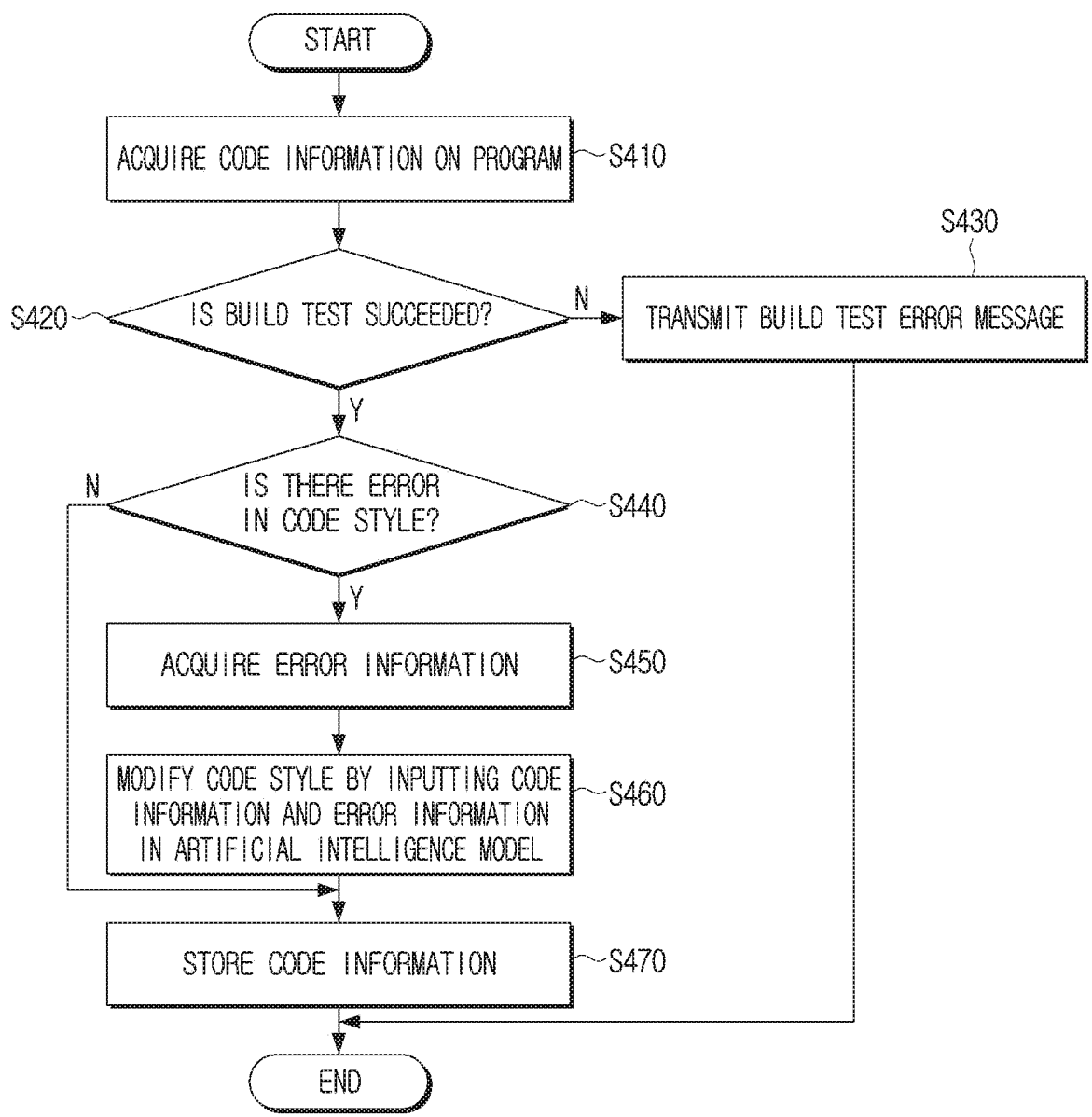
FIG. 4 is a flowchart of a modification method of a code style included in code information for a program in a server according to an embodiment of the disclosure.

FIG. 4 is a flowchart of a method for modifying a code style included in code information for a program in a server according to an embodiment of the disclosure.

Referring to FIG. 4, when code information for a program received from at least one user terminal device 200 is acquired, the server 100 performs a build test operation for the acquired code information and identifies whether the corresponding program operates normally at operations 5410 and 5420.

As a result of the identification, when the program does not operate normally, the server 100 transmits the build test error information on the program to the user terminal device 200 which transmits code information at operation 5430.

Meanwhile, when the program operates normally, the server 100 identifies whether at least one error for the code style included in the code information exists based on the identified code style rule at operation 5440.

The code style rule is to define a style of the code information for the program, and may refer to, for example, a text type, text size, a space between the text and symbols, a space between lines constituting code information, or the like.

When it is identified that there is at least one error with respect to the code style included in code information based on the code style rule, the server 100 acquires error information on at least one error with respect to the identified codes style at operation 5450.

Thereafter, the server 100 modifies the code style included in code information by inputting code information and the acquired error information to the trained AI model, and stores code information including the modified code style at operations 5460 and 5470.

Meanwhile, when the server 100 identifies that at least one error with respect to the code style included in the code information does not exist through 5440 described above, the server 100 stores code information for a program received from the user terminal device 200.

In relation to the aforementioned 5440, the server 100 may identify an error regarding the code style included in code information by using at least one code style check tool, and acquire error information on the identified error.

The code style check tool is a tool for detecting an error of the code style included in code information for the program based on a predetermined code style rule.

The code style check tool may be ESLint, JSLint, or the like when the code information for the program is implemented in a JavaScript format.

Since code style check tools, such as ESLint and JSLint are well known technologies, detailed descriptions thereof will be omitted.

According to an embodiment of the disclosure, when an error of a code style included in code information is detected by using a first tool among at least one code style check tool, the server 100 may acquire a first type of error information related to the first tool.

When an error of a code style included in the code information is detected by using a second tool among at least one code style check tool, the server 100 may acquire a second type of error information related to a second tool.

The AI model may be trained based on a predetermined code style rule and error information related to at least one code style check tool.

For example, the AI model may be trained based on the predetermined code style rule and the first type of error information related to the first tool among at least one code style check tool.

When the first type of error information acquired through the first tool and the code information are input, the AI model may modify the code style included in the code information input based on the pre-trained code style rule and the first type of error information.

The server 100 may change the code style check tool from the first tool to the second tool, and acquire the second type of error information on the error of the code style included in the code information through the changed second tool.

When the second type of error information is acquired, the server 100 inputs the acquired second type of error information and code information into the AI model.

As described above, the AI model may be trained based on the predetermined code style rule and the first type of error information related to the first tool.

When the second type of error information related to the second tool and code information are continuously input to the AI model, the AI model learns based on the input second type of error information and the predetermined code style rule.

Therefore, when the second type of error information and the code information are input, the AI model trained based on the second type of error information and the predetermined code style rule may modify the code style included in the code information based on the input second type of error information.

The AI model may modify the code style included in the code information based on the changed code style rule when the changed code style rule in relation to the predetermined code style rule is input.

Specifically, the server 100 inputs the changed code style rule in relation to the predetermined code style rule to the AI model according to a user command.

The AI model learns the changed code style rule when the changed code style rule is input.

While the changed code style rule is trained in the AI model, when error information on the error of the code style included in code information is acquired by using the code style check tool predetermined based on the changed code style rule, the server inputs the acquired error information and the code information to the AI model.

Accordingly, when the code information and the error information are input from the server 100, the AI model may modify the code style included in the code information based on the changed code style rule and the input error information.

As such, when the code style included in the code information is modified, the server 100 stores the code information including the modified code style.

The method of modifying the code style included in the code information for the program by using the AI model in the server 100 according to the disclosure has been described.

Hereinafter, operations of modifying the code style included in code information for the program using the AI model in the server 100 according to the disclosure will be described below.

FIG. 5 is a diagram of modifying a code style based on error information generated according to a code style rule in a server according to an embodiment of the disclosure.

Referring to FIG. 5, when code information 10 of the program is acquired, the server 100 may use a first tool among at least one code style check to detect an error of the code style included in the code information 10.

The code information 10 on the program may refer to a source code in a JavaScript form, and the first tool may refer to a code style check tool of ESLint.

For example, the first tool detects an error regarding the code style included in the code information 10 on the program based on a predetermined code style rule 510.

According to the predetermined code style rule 510, when an error of the code style included in the code information 10 is not detected, the first tool may identify (or, determine) that there is no error of the code style included in the code information 10.

When the predetermined code style rule 510 is changed, the first tool identifies (or, determines) whether there is an error with respect to the code style included in the code information 10 based on the changed code style rule 520.

The code information 10 may refer to information generated based on the code style rule 510 before being changed. The first tool may identify (or, determine) that there is an error in the code style included in the code information 10 based on the changed code style rule 520, and generate error information 530 for the identified (or, determined) error.

An operation rule, with respect to the existing code style rule 510, called "space-before-blocks: 2" is added to the changed code style rule 520. Accordingly, the first tool may identify (or, determine) that there is an error in the code style included in the code information 10 based on the code style rule 520 to which a source code 521 is added, and generate error information 530 about the identified (or, determined) error.

The server 100 inputs the error information 530 generated through the first tool and the code information 10 into the AI model. The AI model that has already learned the changed code style rule 520 may modify the code style included in the code information 10 based on the changed code style rule 520 and the error information 530 when the error information 530 and the code information 10 are input from the server 100.

As illustrated, the AI model may modify the 'function test (value) {' included in the code information 10 to the 'function test (value) {' based on the input error information 530 and the code information 10. Accordingly, the server 100 may store the modified code information 10' through the AI model.

For example, code information for the program may be generated by a plurality of users, and a first user among the plurality of users may perform coding on the corresponding code information based on the changed code style rule 520. A second user may perform coding on the corresponding code information based on the code style rule 510 before change.

The first tool identifies that there is no error in the code style included in the code information coded by the first user. Meanwhile, the first tool identifies that there is an error in the code style included in the code information coded by the second user, and generates error information on the determined error.

Accordingly, the server 100 inputs the error information generated through the first tool and the code information into the AI model, and the AI model that learned the changed code style rule 520 may modify the code style included in the code information coded by the second user based on the changed code style rule 520 and the error information.

FIG. 6 is a diagram of acquiring changed error information in a server according to a code style check tool according to an embodiment of the disclosure.

Referring to FIG. 6, when code information 20 about the program is acquired, the server 100 may detect an error of the code style included in the code information 20 by using a first tool 610 among at least one code style check tool.

The code information 20 about the program may refer to source code in a JavaScript form, and the first tool 610 may refer to a code style check tool of ESLint.

The first tool 610 detects an error regarding the code style included in the code information 20 about the program based on a predetermined code style rule. According to the predetermined code style rule, when an error regarding the code style included in the code information 20 is detected, the first tool 610 generates error information related to the first tool 610.

For example, the predetermined code style rule may include a first rule 630 "when using '+' in code information, the withspace should be entered." Accordingly, when an error related to the first rule 630 is detected from the code style included in the code information 20, the first tool 610 may generate error information 611 of "4: 25—Operator '+' must be spaced."

A second tool 620 may be a code style check tool of JSLint.

For example, the second tool 620 detects an error about the code style included in the code information 20 on the program based on the predetermined code style rule. According to the predetermined code style rule, when an error about the code style included in the code information 20 is detected, the second tool 620 generates error information related to the second tool 620.

As described above, the predetermined code style rule may include the first rule 630 that is "when using '+' in code information, the withspace should be entered." Accordingly, when an error related to the first rule 630 is detected from the code style included in the code information 20, the second tool 620 may generate error information 621 that are "Expected one space between 'Hello World' and '+'.", "Expected one space between '+' and 'Value'."

In other words, the first and second tools 610 and 620 may generate different error information for the same error detected from the code style included in the code information 20.

When error information for the code style included in the code information 20 generated by the first tool 610 among the first and second tools 610 and 620, the server 100 inputs the acquired error information and the code information 20 to the AI model.

The AI model may refer to a model trained based on the error information generated from the predetermined code style tool and the first tool 610.

When the error information generated from the first tool 610 and the code information 20 are input from the server 100, the AI model may modify 'return "Hello World"+value, 'to' return "Hello World"+value, "based on the pre-trained code style rule and the input error information. Therefore, the server 100 may store the modified code information 20' through the AI model.

When the code style check tool for detecting the error of the code style included in the code information 20 is changed from the first tool 610 to the second tool 620, the server 100 may acquire error information on the code style included in the code information 20 generated through the second tool 620.

When the error information generated from the second tool 620 is acquired, the server 100 inputs the acquired error information and the code information 20 into the AI model.

As described above, the AI model may refer to the model trained based on the error information generated from the predetermined code style tool and the first tool 610.

Accordingly, when the error information generated from the second tool 620 and the code information 20 are continuously input from the server 100, the AI model may learn the error information generated from the second tool 620 and the predetermined code style. The AI model having learned such information may modify the error of the code style included in the code information 20 based on the pre-trained code style rule and the input error information, when the error information generated from the second tool 620 and the code information 20 are input. Accordingly, the server 100 may store the code information 20' in which the error of the code style related to the code information 20 is modified through the AI model.

Figure 7A:
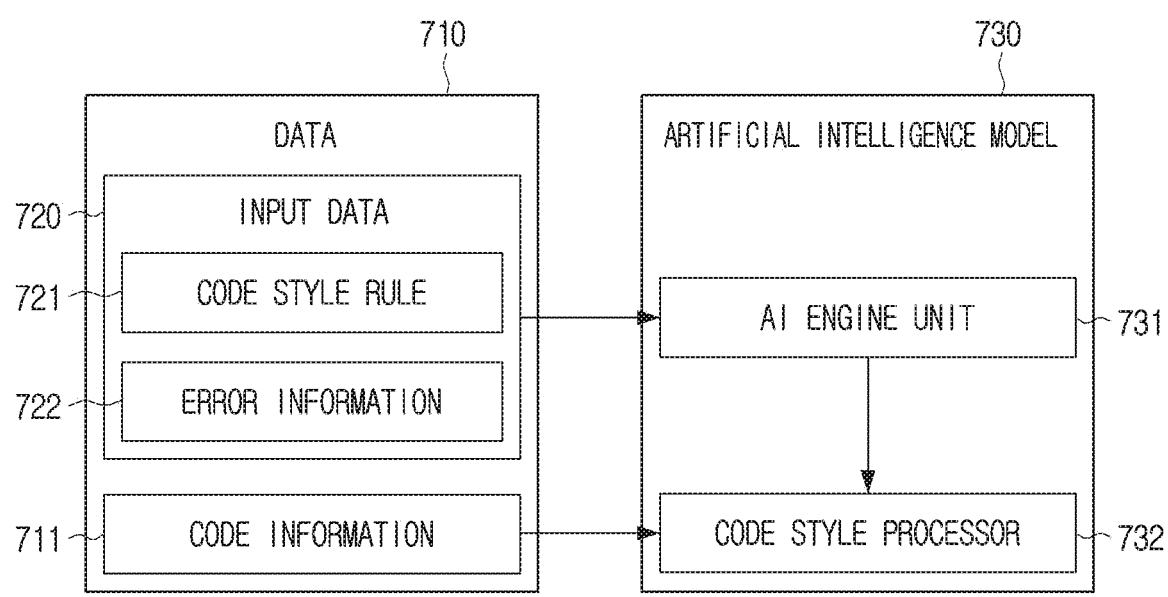
FIG. 7A is a block diagram illustrating learning of an artificial intelligence model for a codes style modification of a program according to an embodiment of the disclosure.

FIG. 7A is a block diagram illustrating learning of an artificial intelligence model for a code style modification of a program according to an embodiment of the disclosure.

FIG. 7B is a diagram illustrating learning of an artificial intelligence model for a code style modification of a program according to an embodiment of the disclosure.

Referring to FIG. 7A, information (data) 710 for modifying a code style included in code information for a program may include code information 711 generated with a specific code style and input data 720 for training an AI model 730.

The input data 720 for training the AI model 730 may include a predetermined code style rule 721 and error information 722 detected from a code style included in code information for a program.

The AI model 730 includes an AI engine unit 731 and a code style processor 723.

The AI engine unit 731 receives and learns the predetermined code style rule 721 included in the input data 720 and the error information 722 detected from the code style included in the code information for the program When code information for the program is input, the code style processor 723 may modify the code style having an error or suggest a modification of the corresponding code style based on the code style rule 721 and the error information 722 learned through the AI engine unit 731.

Referring to FIG. 7B, the AI model 730 may receive the code style rule 721 including a first rule type 740 and the error information 722 including a first error information 750.

When such information is input, the AI engine unit 731 may learn the code information 711 including the input first source code 735, the code style rule 721 including the first rule type 740, and the error information 722 including the error information 750.

Thereafter, when the code information 711 including the first source code 735 is input, the code style processor 723 may generate a source code 770 modified from the first source code 735 or generate a message 760 that suggests a modification of the first source code 735 included in the code information 711 based on the first rule type 740 learned through the AI engine unit 731 and the first error information 750. Meanwhile, the AI engine unit 731 may receive and learn code information in which the code style having an error is modified from the code style processor 723 and code information before the modification. In addition, the AI engine unit 731 may receive and learn code information in which the code style having an error is modified by a user based on the code style rule 721.

As described above, when a modified source code 770 is generated from the first source code 735 based on the first error information 750, the AI engine unit 731, the AI engine unit 731 may receive the first error information 750, the first source code 735, and the modified source code 770 from the code style processor 723. The AI engine unit 731 may receive the modified source code from the user with respect to the first source code 735 having an error.

When the source code 770 modified from the code style processor 723 with respect to the first source code 735 having an error and the source code modified by the user are input, the AI engine unit 731 may perform learning whether the source code 770 modified from the code style processor 723 is correctly modified by comparing whether the two source codes match.

The AI engine 731 compares the source code modified by the code style processor 723 and the source code modified by the user, and learns the comparison result accordingly, so that the AI model 730 can minimize a probability of modification errors with respect to the code style having an error.

The operation of modifying the code style included in the code information adaptively in the AI model according to the code style rule change or the code style check tool change in the server 100 according to the disclosure has been described. Hereinafter, an operation of updating the AI model described above will be described below.

Figure 8:
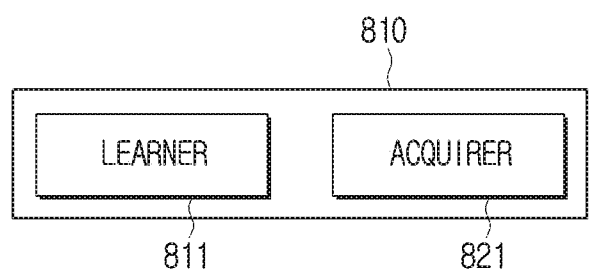
FIG. 8 is a block diagram of a processor of a server that updates and uses an artificial intelligence model according to an embodiment of the disclosure.

FIG. 8 is a block diagram of a processor of a server that updates and uses an artificial intelligence model according to an embodiment of the disclosure.

Referring to FIG. 8, a processor 810 may further include at least one of a learner 811 and an acquirer 821.

The processor 810 may correspond to the processor 130 of the server 100 of FIG. 2.

The learner 811 may generate or learn a model (hereinafter, referred to as a first model) for modifying a code style included in code information for a program acquired by the server 100 using the training data.

The learner 811 may generate, train, or update a first model in which error information for an error of the code style included in the corresponding code information is trained by using the code style rule, code information, and at least one code style check rule using the collected training data.

The acquirer 821 may acquire various information by using predetermined data as input data of the trained model.

For example, the acquirer 821 may acquire (or recognize, estimate) code information including the modified code style by using the input data of the first model trained to modify the code style included in the code information for the program.

At least a part of the learner 811 and at least a part of the acquirer 821 may be implemented as a software module or mounted on the server 100 by being manufactured in the form of at least one hardware chip. For example, at least one of the learner 811 and the acquirer 821 may be manufactured in the form of a dedicated hardware chip for artificial intelligence (AI). The dedicated hardware chip for AI is a dedicated processor specialized in probability computation, and has higher parallelism performance than a general-purpose processor of the related art, so that it may be possible to quickly process computation operations in an AI field, such as machine learning.

When the learner 811 and the acquirer 821 are implemented as a software module (or a program module including instructions), the software module may be stored in a computer readable non-transitory computer readable media. The software module may be provided by an operating system (OS) or by a predetermined application. Alternatively, some of the software modules may be provided by the operating system (OS), and others may be provided by the predetermined application.

The learner 811 and the acquirer 821 may be mounted in one server 100 or may be mounted in separate electronic devices. For example, one of the learner 811 and the acquirer 821 may be included in the server 100, and the other may be included in an external server (not illustrated). In addition, the learner 811 and the acquirer 821 may provide model information constructed by the learner 811 to the acquirer 821 via a wired or wireless connection, or data input through the learner 811 may be provided to the learner 811 as additional learning data.

Figure 9A:
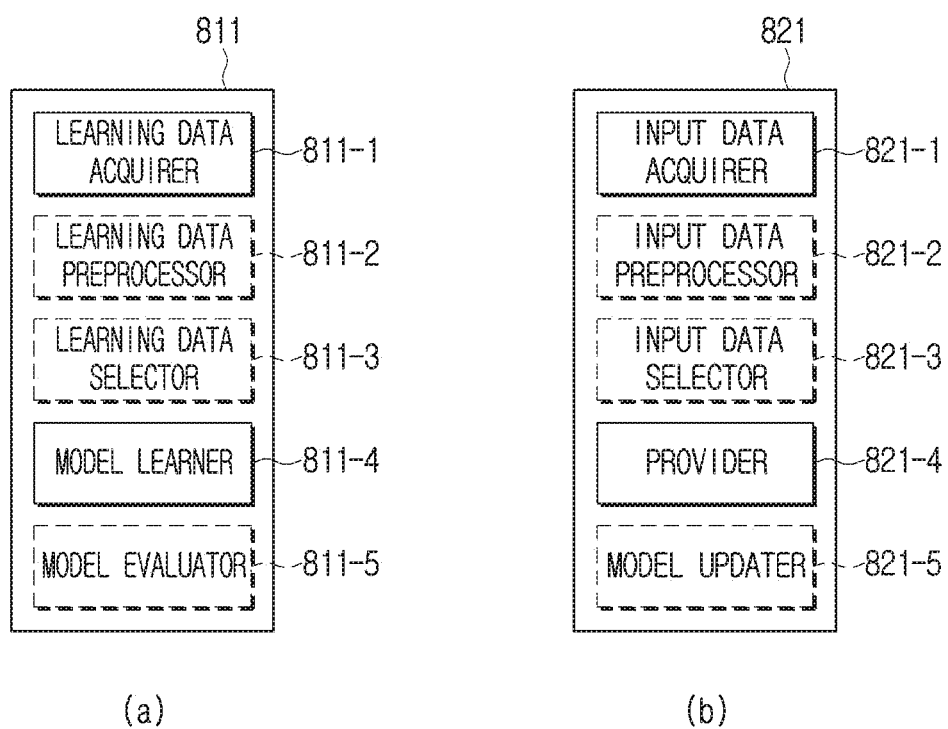
FIG. 9A is a block diagram of learner and an acquirer according to an embodiment of the disclosure.

FIG. 9A is a block diagram of learner and an acquirer according to an embodiment of the disclosure.

Referring to (a) of FIG. 9A, the learner 811 may include a learning data acquirer 811-1 and a model learner 811-4. In addition, the learner 811 may further selectively include at least one of a learning data preprocessor 811-2, a learning data selector 811-3, and a model evaluator 811-5.

The learning data acquirer 811-1 may acquire learning data required for a first model and a second model. According to an embodiment of the disclosure, the learning data acquirer 811-1 may acquire error information for the code style included in the corresponding code information acquired by using the code style rule, the code information, and at least one code style check tool as the learning data. The learning data may refer to the learner 811 or data collected or tested by a manufacturer of the learner 811.

The model learner 811-4 may train to have criteria about how to modify an error of the code style by using the learning data. For example, the model learner 811-4 may train the AI model through supervised learning using at least some of the learning data as criteria. As another example, the model learner 811-4 may learn itself by using learning data without further guidance, and train the AI model through unsupervised learning which finds criteria for identifying circumstances.

As another example, the model learner 811-4 may learn the AI model through reinforcement learning which uses feedback on whether the result of the circumstances identification according to learning is correct. In addition, the model learner 811-4, for example, may train the AI model using a learning algorithm including an error back-propagation method or a gradient descent method, etc.

If there are a plurality of pre-established AI models, the model learner 811-4 may identify an AI model with high relevancy between input learning data and basic learning data as an AI model to learn. In this case, the basic learning data may be pre-classified according to the type of data, and the AI model may be pre-established according to the type of data.

For example, the basic learning data may be pre-classified by various criteria, such as an area where the learning data is generated, a time at which the learning data is generated, a size of the learning data, a genre of the learning data, a creator of the learning data, a type of object in the learning data, etc.

Further, when the AI model is learned, the model learner 811-4 may store the learned AI model. In this case, the model learner 811-4 may store the learned AI model in the memory 120 of the server 100. Alternatively, the model learner 811-4 may store the learned AI model in a memory of an AI server (not illustrated) connected to the server 100 through a wired or wireless network.

The learner 811 may further include a learning data preprocessor 811-2 and the learning data selector 811-3 in order to improve a recognition result of the AI model or to save resources or time required for generating the AI model.

The learning data preprocessor 811-2 may preprocess the corresponding data so that the acquired data can be used to modify an error of the code style included in the code information for the program. The learning data preprocessor 811-2 may process the data into a predetermined format so that the model learner 811-4 can use the acquired data to modify the error of the code style included in the code information for the program.

The learning data selector 811-3 may select data necessary for learning from data acquired by the learning data acquirer 811-1 or data preprocessed by the learning data preprocessor 811-2. The selected learning data may be provided to the model learner 811-4.

The learning data selector 811-3 may select learning data required for learning from among the acquired or preprocessed data according to a predetermined criterion for selection. In addition, the learning data selector 811-3 may select the learning data according to the predetermined criteria for selection by learning of the model learner 811-4.

The learner 811 may further include a model evaluator 811-5 to improve the recognition result of the AI model.

The model evaluator 811-5 may input evaluation data to an AI model, and if the recognition result output from the evaluation data does not satisfy predetermined criteria, allow the model learner 811-4 to learn again. In this case, the evaluation data may be predetermined data for evaluating the AI model.

For example, if the number or the ratio of the evaluation data whose recognition result is not accurate among the recognition results of the learned AI model for the evaluation data exceeds a predetermined threshold value, the model evaluator 811-5 may evaluate that predetermined criteria are not satisfied.

On the other hand, when there are a plurality of learned AI models, the model evaluator 811-5 may evaluate whether each of the learned models satisfies the predetermined criteria and identify the model which satisfies the predetermined criteria as the final AI model. When there are a plurality of models satisfying the predetermined criteria, the model evaluator 811-5 may identify any one or a predetermined number of models previously set in descending order of the evaluation score as the final AI model.

Meanwhile, the acquirer 821 may include an input data acquirer 821-1 and a provider 821-4, as illustrated in (b) of FIG. 9A.

In addition, the acquirer 821 may further include at least one of an input data preprocessor 821-2, an input data selector 821-3, and a model updater 821-5.

The input data acquirer 821-1 may acquire data required for acquiring information for error modification of a code style included in code information for a program.

The provider 821-4 may apply the input data acquired by the input data acquirer 821-1 to the AI model learned as an input value and acquire information for modifying the error of the code style included in the code information for the program.

The provider 821-4 may apply data selected by the input data preprocessor 821-2 or the input data selector 821-3 which will be described later as an input value to the AI model to obtain a recognition result. The recognition result may be determined by the AI model.

In an embodiment of the disclosure, the provider 821-4 may apply an image related data acquired by the input data acquirer 821-1 to the learned first model to modify (or estimate) the error of the code style included in code information for a program.

The acquirer 821 may further include the input data preprocessor 821-2 and the input data selector 821-3 to improve the recognition result of the AI model or to save resources or time for providing the recognition result.

The input data preprocessor 821-2 may pre-process acquired data so that the acquired data can be used to be input to the first and second models. The input data preprocessor 821-2 may process the acquired data as a predetermined format such that the provider 821-4 uses the acquired data for modifying the error of the code style included in code information for the program.

The input data selector 821-3 may select data required for circumstances identification from among data acquired by the input data acquirer 821 or data preprocessed by the input data preprocessor 821-2. The selected data may be provided to the provider 821-4. The input data selector 821-3 may select some or all of the acquired or preprocessed data according to predetermined criteria for circumstances identification. In addition, the input data selector 821-3 may select data according to the criteria predetermined by learning of the model learner 821-4.

The model updater 821-5 may control the AI model to be updated based on the evaluation of the recognition result provided by the provider 821-4.

For example, the model updater 821-5 may provide the recognition result provided by the provider 821-4 to the model learner 821-4 and request such that the model learner 821-4 further learns or updates the AI model.

Figure 9B:
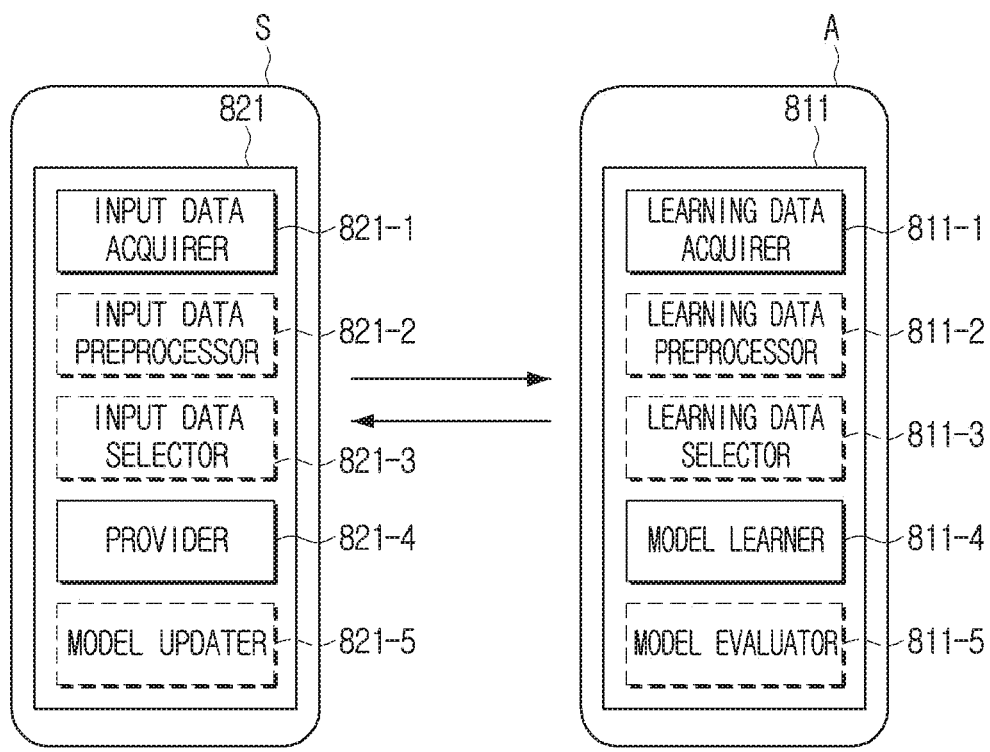
FIG. 9B is a diagram in which a server and an external device learn and identify (or, determine) data connected to each other according to an embodiment of the disclosure.

FIG. 9B is a diagram in which a server and an external device learn and identify data connected to each other according to an embodiment of the disclosure.

Referring to FIG. 9B, the external device A acquires information for error modification of a code style included in code information for a program.

The server S may modify an error of a code style included in code information for a program by using models generated based on a learning result of the external device A.

In this case, the model learner 811-4 of the external device A may perform a function of the learner 811 illustrated in FIG. 8. The model learner 811-4 of the external device A may learn identification criteria (or recognition criteria) for the first and second models.

In addition, the provider 821-4 of the server S may apply the data selected by the input data selector 821-3 to an AI model generated by the external device A to acquire code information including the code style in which the error is modified.

In addition, the provider 821-4 of the server S may receive the AI model generated by the external device A from the external device A, and acquire code information including the cod style in which an error is modified by using the received AI model.

Up until now, an operation of modifying an error of a code style included in code information for a program using an AI model in the server 100 according to the disclosure has been described.

As described above, according to the disclosure, the server may identify an error included in the code style of the code for the program and automatically modify the error of the determined code style.

According to an embodiment of the disclosure, the various embodiments described above may be implemented as software including instructions stored in a machine-readable storage media which is readable by a machine (e.g., a computer). The device may include the electronic device according to the disclosed embodiments, as a device which calls the stored instructions from the storage media and which is operable according to the called instructions. When the instructions are executed by a processor, the processor may directory perform functions corresponding to the instructions using other components or the functions may be performed under a control of the processor. The instructions may include code generated or executed by a compiler or an interpreter. The machine-readable storage media may be provided in a form of a non-transitory storage media. The 'non-transitory' means that the storage media does not include a signal and is tangible, but does not distinguish whether data is stored semi-permanently or temporarily in the storage media.

In addition, according to an embodiment of the disclosure, the methods according to various embodiments described above may be provided as a part of a computer program product. The computer program product may be traded between a seller and a buyer. The computer program product may be distributed in a form of the machine-readable storage media (e.g., compact disc read only memory (CD-ROM) or distributed online through an application store (e.g., PlayStore™). In a case of the online distribution, at least a portion of the computer program product may be at least temporarily stored or provisionally generated on the storage media, such as a manufacturer's server, the application store's server, or a memory in a relay server.

Further, each of the components (e.g., modules or programs) according to the various embodiments described above may include a single entity or a plurality of entities, and some subcomponents of the above-mentioned subcomponents may be omitted or the other subcomponents may be further included to the various embodiments. Generally, or additionally, some components (e.g., modules or programs) may be integrated into a single entity to perform the same or similar functions performed by each respective component prior to integration. Operations performed by a module, a program, or other component, according to various embodiments, may be sequential, parallel, or both, executed iteratively or heuristically, or at least some operations may be performed in a different order, omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A control method of a server, the method comprising:
acquiring code information about a program;
identifying at least one error with respect to a code style comprised in the code information based on a predetermined code style rule;
acquiring information of different errors corresponding to different code style check tools that identified a same error with respect to the code style; and
modifying the code style by inputting the code information and the information of at least one of the different errors to an artificial intelligence model,
wherein the acquiring of the information of the different errors comprises:
based on an error of the code style comprised in the code information being detected by using a first tool among the plurality of code style check tools, acquiring a first type of error information related to the first tool, and
after changing a code style check tool from the first tool to a second tool, acquiring a second type of error information related to the second tool,
wherein the first tool and the second tool generate different error information for the same error detected from the code style included in the code information,
wherein the artificial intelligence model is configured to be trained based on the predetermined code style rule and the first type of error information, and continuously to be trained based on the predetermined code style rule, the code information, and the second type of error information different from the first type of error information,
wherein the identifying of the at least one error comprises, based on a changed code style rule being input with regard to the code style rule, identifying the at least one error with respect to the code style comprised in the code information based on the changed code style rule, and
wherein the changed code style rule is a rule in which a predetermined operation rule is added to the predetermined code style rule.

2. The method of claim 1, further comprising:
identifying whether the program operates normally by performing a build test on the acquired code information,
wherein the identifying of the at least one error comprises identifying the at least one error with respect to the code style comprised in the code information based on the program being operated normally.

3. The method of claim 1, further comprising:
storing the code information comprising modified code style,
wherein the storing of the code information comprises storing the code information based on the code information being identified that there is no error with respect to the code style comprised in the code information.

4. The method of claim 1, wherein the code information is information generated based on the predetermined code style rule before being changed.

5. The method of claim 1,
wherein first code information generated by a first user among a plurality of users is coded based on the changed code style rule and second code information generated by a second user among the plurality of users is coded based on a preset code style rule,
wherein the first tool identifies that there is no error in the code style included in the first code information,
wherein the second tool identifies that there is an error in the code style included in the second code information and generates error information on the error, and
wherein the artificial intelligence model modifies the code style included in the second code information based on the changed code style rule and the generated error information.

6. A server comprising:
a communicator comprising a circuit;
a memory comprising at least one instruction; and
at least one processor configured to execute the at least one instruction,
wherein the at least one processor is further configured, based on code information about a program received from at least one user terminal device being acquired through the communicator, to:
  identify at least one error with respect to a code style comprised in the code information based on a predetermined codes style rule,
  acquire information of different errors corresponding to different code style check tools that identified a same error with respect to the code style, and
  modify the code style by inputting the code information and the information of at least one of the different errors to an artificial intelligence model,
wherein the at least one processor is further configured to:
  based on an error of the code style comprised in the code information being detected by using a first tool among the plurality of code style check tools, acquire a first type of error information related to the first tool, and
  after changing a code style check tool from the first tool to a second tool, acquire a second type of error information related to the second tool,
wherein the first tool and the second tool generate different error information for the same error detected from the code style included in the code information,
wherein the artificial intelligence model is configured to be trained based on the predetermined code style rule and the first type of error information, and continuously, to be trained based on the predetermined code style rule, the code information, and the second type of error information different from the first type of error information,
wherein the at least one processor is further configured to:
  based on a changed code style rule being input with regard to the code style rule, identify the at least one error with respect to the code style comprised in the code information based on the changed code style rule, and
wherein the changed code style rule is a rule in which a predetermined operation rule is added to the predetermined code style rule.

7. The server of claim 6, wherein the at least one processor is further configured to:
identify whether the program operates normally by performing a build test on the acquired code information, and
identify the at least one error with respect to the code style comprised in the code information based on the program being normally operated.

8. The server of claim 6, wherein the at least one processor is further configured to control the memory to store the code information comprising modified code style.

9. The server of claim 6, wherein the code information is information generated based on the predetermined code style rule before being changed.

10. The server of claim 6,
wherein first code information generated by a first user among a plurality of users is coded based on the changed code style rule and second code information generated by a second user among the plurality of users is coded based on a preset code style rule,
wherein the first tool identifies that there is no error in the code style included in the first code information,
wherein the second tool identifies that there is an error in the code style included in the second code information and generates error information on the error, and
wherein the artificial intelligence model modifies the code style included in the second code information based on the changed code style rule and the generated error information.

\* \* \* \* \*